US006970250B1

(12) United States Patent
Sorin et al.

(10) Patent No.: US 6,970,250 B1
(45) Date of Patent: Nov. 29, 2005

(54) METHOD AND SYSTEM FOR OPTICAL HETERODYNE DETECTION OF AN OPTICAL SIGNAL THAT UTILIZES OPTICAL ATTENUATION

(75) Inventors: Wayne V. Sorin, Mountain View, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 595 days.

(21) Appl. No.: 09/488,149

(22) Filed: Jan. 20, 2000

(51) Int. Cl.[7] .............................................. G01B 9/02

(52) U.S. Cl. ...................... 356/477; 356/484; 359/191; 359/189; 359/192

(58) Field of Search ................................ 356/477, 484; 359/191, 189, 192

(56) References Cited

U.S. PATENT DOCUMENTS

| | | | | |
|---|---|---|---|---|
| 4,048,573 | A * | 9/1977 | Evans et al. | 330/2 |
| 4,553,264 | A * | 11/1985 | Hasegawa et al. | 455/189.1 |
| 4,856,899 | A | 8/1989 | Iwaoka et al. | 356/346 |
| 5,365,335 | A | 11/1994 | Sorin | 356/345 |

* cited by examiner

*Primary Examiner*—Robert Kim
*Assistant Examiner*—George Y. Wang

(57) ABSTRACT

Monitoring an optical signal utilizing optical heterodyne detection involves attenuating an input signal before the input signal is combined with a local oscillator signal. The input signal is attenuated in order improve the signal to noise ratio of the heterodyne signal that is generated when the input signal and the local oscillator signal are combined. The signal to noise ratio of the heterodyne signal improves with attenuation of the input signal, specifically in the case where the intensity noise from the input signal is the dominant noise source, because the heterodyne signal and the intensity noise of the input signal scale differently with attenuation of the input signal.

20 Claims, 4 Drawing Sheets

METHOD AND SYSTEM FOR OPTICAL HETERODYNE DETECTION OF AN OPTICAL SIGNAL THAT UTILIZES OPTICAL ATTENUATION

FIELD OF THE INVENTION

The invention relates generally to the field to optical measurements and measuring systems, and more particularly to a method and system for optical heterodyne detection of an optical signal.

BACKGROUND OF THE INVENTION

Dense wavelength division multiplexing (DWDM) requires optical spectrum analyzers (OSAs) that have higher spectral resolution than is typically available with current OSAs. For example, grating based OSAs and autocorrelation based OSAs encounter mechanical constraints, such as constraints on beam size and the scanning of optical path lengths, which limit the degree of resolution that can be obtained.

As an alternative to grating based and autocorrelation based OSAs, optical heterodyne detection systems can be utilized to monitor DWDM systems. FIG. 1 is a depiction of a prior art optical heterodyne detection system. The optical heterodyne detection system includes an input signal 102, an input waveguide 104, a local oscillator signal 106, a local oscillator waveguide 108, an optical coupler 110, an output waveguide 118, an optical receiver 112, and a signal processor 116. The principles of operation of optical heterodyne detection systems are well known in the field of optical heterodyne detection and involve monitoring the heterodyne term that is generated when an input signal is combined with a local oscillator signal. Optical heterodyne detection systems are not limited by the mechanical constraints that limit the grating based and autocorrelation based OSAs. The spectral resolution of an optical heterodyne system is limited by the linewidth of the local oscillator signal, which can be several orders of magnitude narrower than the resolution of other OSAs.

In order to improve the performance of optical heterodyne detection systems with regard to parameters such as sensitivity and dynamic range, it is best to have a high signal to noise ratio for the heterodyne signal. However, the desired heterodyne signal coexists with other direct detection signals. The direct detection signals in DWDM systems include intensity noise from the input signal and shot noise from the local oscillator signal that can mask the desired heterodyne signal. One technique for improving the signal to noise ratio of the heterodyne signal involves reducing the intensity noise by utilizing two detectors to accomplish balanced detection. Although balanced detection is useful in improving the signal to noise ratio for the heterodyne signal, it has limitations.

Another technique for heterodyne signal detection described in U.S. Pat. No. 4,856,899 involves amplifying the input signal before the input signal is combined with the local oscillator signal in order to increase the amplitude of the heterodyne signal. Although amplifying the input signal increases the amplitude of the heterodyne signal, the amplification also increases the intensity noise of the input signal and may not improve the signal to noise ratio of the heterodyne signal.

In view of the prior art limitations, what is needed is an optical heterodyne detection system that generates a heterodyne signal with a high signal to noise ratio.

SUMMARY OF THE INVENTION

A method and system for monitoring an optical signal utilizing optical heterodyne detection involves attenuating an input signal before the input signal is combined with a local oscillator signal. The input signal is attenuated in order improve the signal to noise ratio of the heterodyne signal that is generated when the input signal and the local oscillator signal are combined. The signal to noise ratio of the heterodyne signal improves with attenuation of the input signal, specifically in the case where the intensity noise from the input signal is the dominant noise source, because the heterodyne signal and the intensity noise of the input signal scale differently with attenuation of the input signal.

An embodiment of an optical heterodyne detection system includes an attenuator, an optical coupler, and a receiver. The attenuator has an input to receive an input signal and an output for outputting the input signal after attenuation. The optical coupler has a first input that is optically connected to the attenuator to receive the attenuated input signal and a second input that receives the local oscillator signal. The optical coupler combines the attenuated input signal and the local oscillator signal to create a combined optical signal and outputs the combined optical signal through an output. The optical receiver receives the combined optical signal from the optical coupler and generates an electrical signal that is representative of the combined optical signal.

An embodiment of the optical heterodyne detection system also includes a processor that utilizes the electrical signal from the receiver to generate an output signal that is indicative of an optical parameter of the input signal. The processor monitors the heterodyne signal that is a component of the combined optical signal in order to generate the output signal.

In an embodiment of the optical heterodyne detection system, the attenuator is adjustable so that the input signal can be attenuated to different levels. Preferably, the attenuator is adjusted to attenuate the input signal to a level that maximizes the signal to noise ratio of the heterodyne signal. In an embodiment, the signal to noise ratio is maximized when the intensity noise of input signal is approximately equal to the shot noise of the local oscillator signal. A feedback loop may be provided between the processor and the adjustable attenuator so that the attenuator can be adjusted in response to real-time measurements of the signal to noise ratio of the heterodyne signal.

A method for monitoring an optical signal utilizing optical heterodyne detection includes providing an input signal and a local oscillator signal and attenuating the input signal. The attenuated input signal is combined with the local oscillator signal to create a combined optical signal. The combined optical signal includes a heterodyne signal and intensity noise from the input signal. The combined optical signal is detected and an output signal that is indicative of an optical parameter of the input signal is generated. In an embodiment, the level of attenuation of the input signal is adjusted to maximize the signal to noise ratio of the heterodyne signal.

Before utilizing the system to measure an input signal it may be necessary to calibrate the system. The attenuator may be utilized to block transmission of the input signal so that the optical coupler and the receiver can be calibrated.

Other aspects and advantages of the present invention will become apparent from the following detailed description, taken in conjunction with the accompanying drawings, illustrating by way of example the principles of the invention.

DETAILED DESCRIPTION OF THE INVENTION

An embodiment of the invention involves an optical heterodyne detection system in which an input signal is attenuated before the input signal is combined with a local oscillator signal. The input signal is attenuated in order to improve the signal to noise ratio of the heterodyne signal that is generated when the input signal and the local oscillator signal are combined.

As is known in the field of optical heterodyne detection, an input signal and local oscillator signal combine to create an optical signal having components that include intensity noise from the input signal, shot noise from the local oscillator signal, and the heterodyne signal. When the intensity noise of the input signal is the dominant noise source, attenuating the input signal before the input signal is combined with the local oscillator signal improves the signal to noise ratio of the heterodyne signal. The signal to noise ratio of the heterodyne signal is improved because the intensity noise of the input signal and the heterodyne signal scale differently with attenuation of the input signal. Specifically, when the noise of the combined optical signal is dominated by the intensity noise of the input signal, the intensity noise of the input signal is proportional to the power of the input signal ($P_S$). The relationship of the input signal intensity noise, $I_N$, to the power of the input signal is:

$$I_N \alpha P_S$$

On the other hand, the intensity of the heterodyne signal is proportional to the square root of the input signal, $P_S$. The relationship of the intensity of the heterodyne signal, $I_H$, to the power of the input signal is:

$$I_H \alpha \sqrt{P_s}$$

Because of the different scaling relationships between the intensity noise of the input signal and the heterodyne signal, attenuating the power of the input signal causes the intensity noise of the input signal to drop at a faster rate than the heterodyne signal. Because the intensity noise of the input signal drops at a faster rate than the heterodyne signal, the signal to noise ratio of the heterodyne signal ($I_H/I_N$) increases when the intensity noise of the input signal is the dominant noise source. The increased signal to noise ratio of the heterodyne signal provides a better signal for identifying a desired parameter of the input signal.

Figure 1:
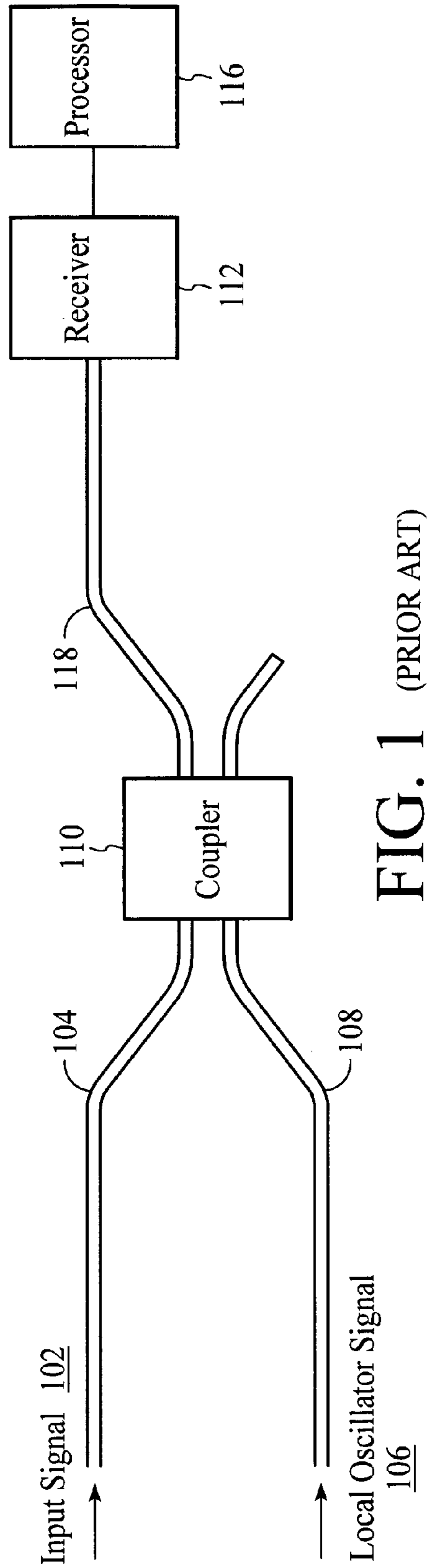
FIG. 1 is a depiction of an optical heterodyne detection system in accordance with the prior art.
Figure 2:
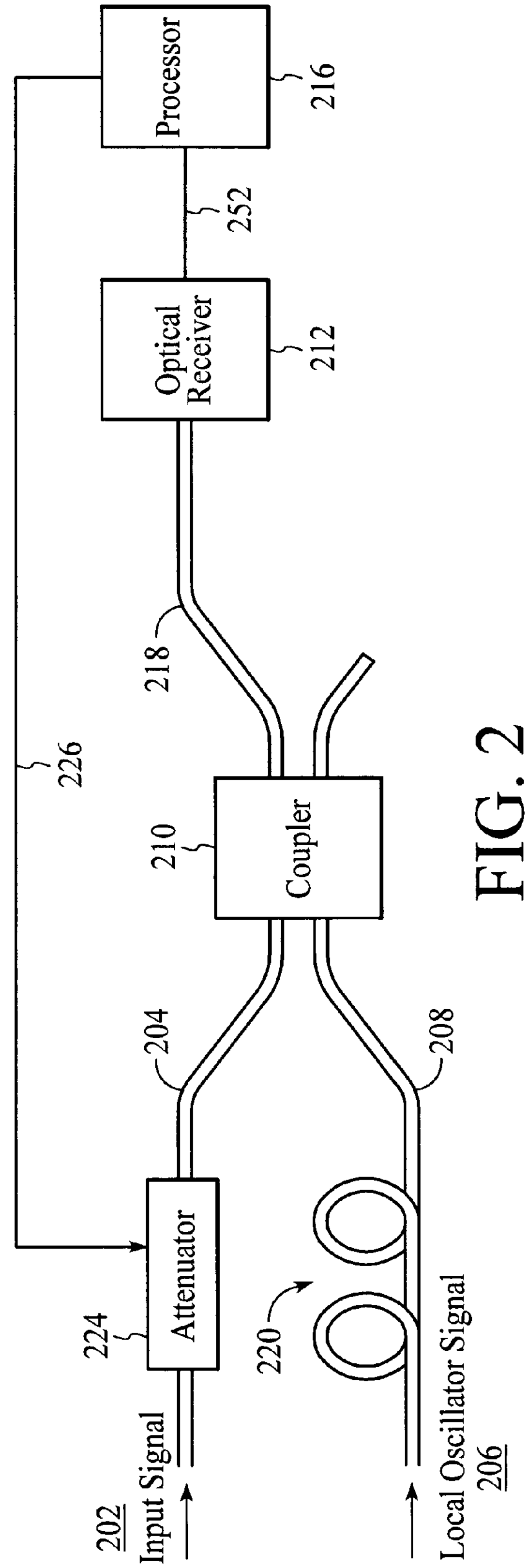
FIG. 2 is a depiction of an optical heterodyne detection system that includes an attenuator associated with the input signal in accordance with an embodiment of the invention.

FIG. 2 is a depiction of an optical heterodyne detection system in which the input signal is attenuated to improve the signal to noise ratio of the heterodyne signal. The optical heterodyne detection system includes an input signal 202, a signal fiber 204, an attenuator 224, a local oscillator signal 206, a local oscillator fiber 208, an optical coupler 210, an optical receiver 212, and a processor 216.

The input signal 202 and the local oscillator signal 206 include optical signals that are generated from conventional devices as is known in the field of optical communications systems. For example, the input signal and the local oscillator signal may be generated from lasers. The input signal may consist of a single wavelength or the input signal may include multiple wavelengths as is known in the field of wavelength division multiplexing. The input signal may be an optical signal having unknown optical characteristics, in which case the optical heterodyne detection system can be utilized for optical spectrum analysis. The input signal may alternatively be an optical signal that is input with known optical characteristics, in which case the optical heterodyne detection system can be utilized for optical network analysis. In an embodiment, the known input signal may be a delayed portion of the local oscillator signal. When the monitoring system is utilized for optical network analysis, the characteristics of a network or a single network component can be determined by inputting a known input signal into the network or the single network component and then measuring the response to the known signal. As is described below, the frequency of the local oscillator is swept across a range of wavelengths during optical spectrum analysis and optical network analysis.

Preferably, the local oscillator signal is a widely tunable optical signal generated from a wideband tunable laser. For example, the local oscillator signal may be tunable over a range of one nanometer or greater. During optical spectrum analysis, the local oscillator signal is typically swept across a wavelength range in order to detect the input signal at each wavelength.

The signal fiber 204 carries the input signal that is to be detected by the system. In an embodiment, the signal fiber is a single mode optical fiber as is known in the art, although other optical waveguides may be utilized. In addition, although waveguides are described, optical signals may be input into the system, or transmitted within the system, in free space.

The attenuator 224 is an optical device that attenuates an input signal. In an embodiment, the attenuator is integrated into the input fiber 204 in order to attenuate the input signal 202. The particular type of attenuator is not critical and therefore various types of attenuators as are known in the field of optical attenuation may be utilized. Preferably, the attenuator is adjustable such that the level of attenuation can be varied as needed to control the intensity of the input signal that is passed to the optical coupler 210. In an embodiment, the attenuator can be adjusted to completely block transmission of the input signal. Completely blocking transmission of the input signal can be useful during system calibration, as is described below.

The local oscillator fiber 208 is an optical fiber, such as a single mode optical fiber, that carries the local oscillator signal 206. The local oscillator fiber may include a polarization controller 220 that controls the polarization state of the local oscillator signal. Other optical waveguides may be utilized in place of single mode optical fiber, such as polarization preserving fiber. Alternatively, the local oscillator signal may be transmitted into the system through free space without the use of a waveguide.

The optical coupler 210 combines the input signal 202 and the local oscillator signal 206 onto a common waveguide. As shown in FIG. 2, the optical coupler combines the input signal and the local oscillator signal and distributes the combined optical signal into an output fiber 218. In an embodiment, the input signal and the local oscillator signal are combined in a manner that ensures the spatial overlap of the input signal and the local oscillator signal, thereby causing maximum interference between the input signal and the local oscillator signal. Although only one output fiber is shown in FIG. 2, more than one output fiber can be utilized to transmit a portion of the combined optical signal to the optical receiver. An embodiment of the optical heterodyne detection system that includes two output fibers is described below with reference to FIG. 4.

The optical coupler 210 may be an optically directional 3 dB fiber coupler, although other optical couplers may be utilized. In an embodiment, the optical coupler is substantially independent of the polarization of the input signal 202 and the local oscillator signal 206. In an embodiment, the optical coupler does not polarize the combined optical signal.

The output fiber 218 connected to the optical coupler 210 carries the combined optical signal to the optical receiver 212. Other optical waveguides may be utilized in place of the single mode optical fiber. Alternatively, the combined optical signal may be transmitted to the optical receiver through free space without the use of a waveguide.

The optical receiver 212 is connected to receive the combined optical signal from the optical coupler 210 and generates electrical signals in response to the combined optical signal. In an embodiment, the optical receiver includes a polarization diversity receiver as is known in the field of coherent optical systems. The polarization diversity receiver generates electrical signals that are independent of the polarization state of the input signal 202. In an embodiment, the optical receiver relies on the processor to perform signal processing, such as the processing required to generate electrical signals that are independent of the polarization state of the input signal. Although not shown, the optical receiver may include photodetectors, signal amplifiers, and filters, as is known in the field. The electrical signals generated by the optical receiver 212 are provided to the processor 216 via an electrical connection 252. As an alternative to a photodetector based optical receiver, the optical receiver may utilize other detection devices, such as a non-linear mixing element.

The processor 216 receives the electrical signals from the optical receiver 212 and processes the electrical signals into useful data. The processor may include analog signal processing circuitry and/or digital signal processing circuitry, as is known in the field of electrical signal processing. In an embodiment, analog signals from the optical receiver are converted into digital signals and the digital signals are subsequently processed to generate an output signal. It should be understood that digital signal processing involves converting the analog signals from the optical receiver into digital signals that are representative of the original analog signals.

In operation, the input signal 202 is transmitted through the attenuator 224 where the input signal is attenuated to a selected level. The attenuated input signal is transmitted to the optical coupler 210 and combined with the local oscillator signal 206 as the local oscillator signal is being swept across a wavelength range. The combined optical signal is output onto output fiber 218 and transmitted to the optical receiver 212. The combined optical signal is detected by the optical receiver and electrical signals are generated in response to the combined optical signal. The electrical signals are processed by the processor 216 to provide polarization diversity. The heterodyne signal generated from the combination of the input signal and the local oscillator signal is monitored to determine an optical parameter of the input signal, such as wavelength or amplitude.

As described above, attenuating the input signal, before the input signal is combined with the local oscillator signal is preferably performed when the intensity noise of the input signal is the dominant noise source. Under this condition, attenuating the input signal improves the signal to noise ratio of the heterodyne signal because the intensity noise of the input signal and the heterodyne signal scale differently with attenuation of the input signal. Preferably, attenuation of the input signal is adjusted to a level that maximizes the signal to noise ratio of the heterodyne signal. In an embodiment, the signal to noise ratio is maximized when the input signal is attenuated such that the intensity noise of the input signal is approximately equal to the shot noise of the local oscillator signal.

It should be noted that the signal to noise ratio of the heterodyne signal does not increase indefinitely with continued attenuation of the input signal. As the attenuation of the input signal is increased, eventually a noise component, or components, other than the intensity noise from the input signal will become dominant and further attenuation of the input signal will reduce the signal to noise ratio of the heterodyne signal. For example, at some point the noise in the optical receiver may become the dominant noise source over the intensity noise of the input signal. Therefore, in an embodiment, the level of attenuation is maintained such that the intensity noise of the input signal is approximately equal to the sum of the other noise sources.

In an embodiment, a feedback loop 226 is provided between the processor 216 and the attenuator 224. The feedback loop allows the attenuation of the input signal 202 to be adjusted in response to real-time measurements of the signal to noise ratio of the heterodyne signal.

Although the attenuator 224, the optical coupler 210, and the optical receiver 212 of the optical heterodyne detection system are described as being connected by optical fibers, the individual devices may be integrated onto a monolithic device, such as a planar waveguide circuit. Alternatively, the attenuator, the optical coupler, and the optical receiver may be connected by free space.

Figure 3:
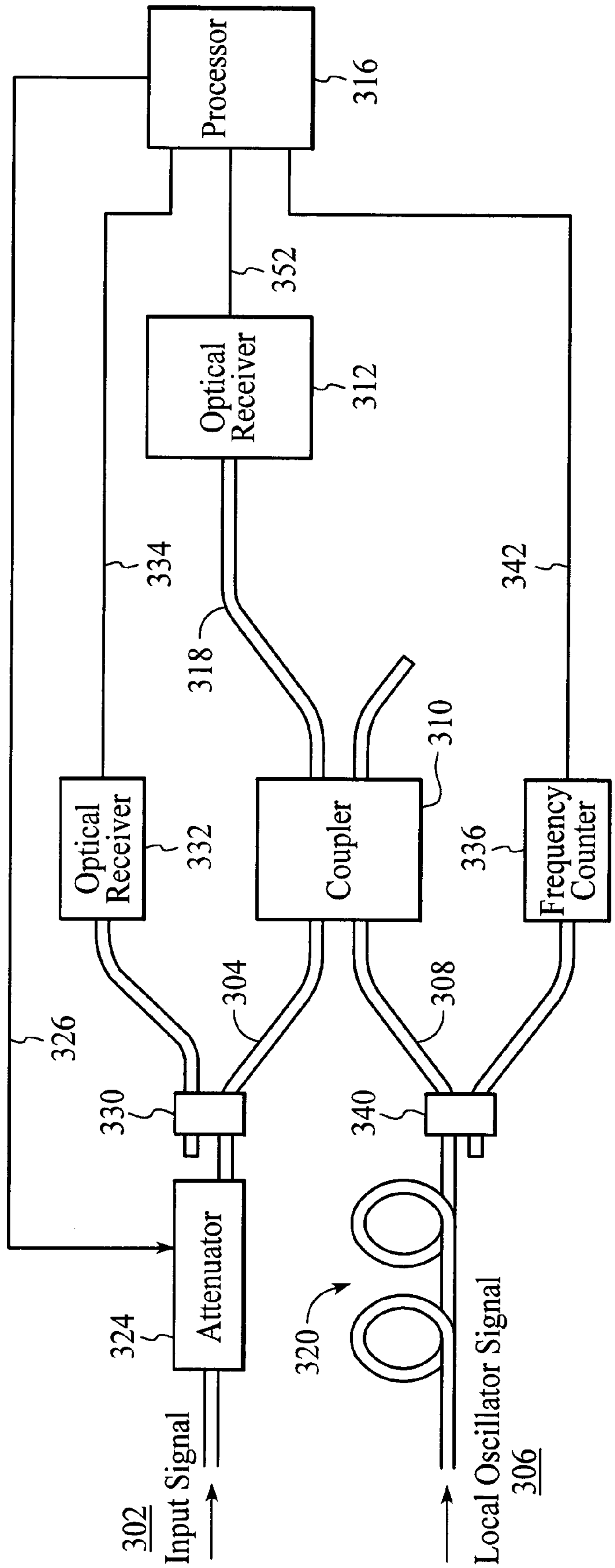
FIG. 3 is a depiction of an optical heterodyne detection system that includes an attenuator, an additional optical receiver and a frequency counter in accordance with an embodiment of the invention.
Figure 4:
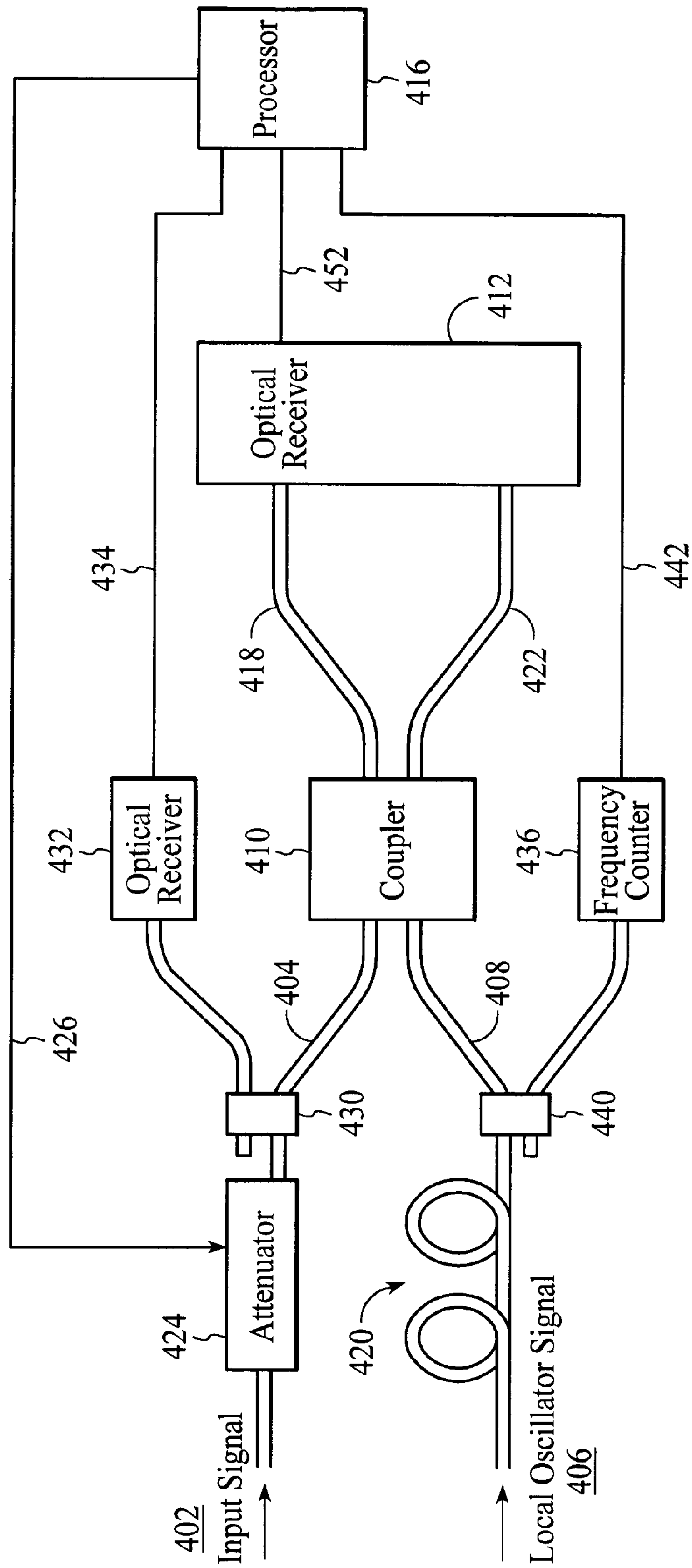
FIG. 4 is a depiction of an optical heterodyne detection system that includes an attenuator and two output fibers from the optical coupler in accordance with an embodiment of the invention.

FIG. 3 is a depiction of an optical heterodyne detection system that is similar to the system of FIG. 2 except that it includes an additional optical receiver 332, a frequency counter 336, and two couplers 330 and 340. It should be noted that similar elements in FIGS. 2, 3, and 4 are represented by similar element numbers. The additional optical receiver of FIG. 3 is connected to the input fiber 304 by the coupler 330. The coupler is located after the attenuator 324 and is utilized to tap a portion of the attenuated input signal 302 from the input fiber. The tapped portion of the input signal is transmitted to the additional optical receiver. The additional optical receiver detects the intensity noise of the input signal and transmits an electrical signal representative of the intensity noise to the processor 216 via connection 334. The processor can then compare the intensity noise of the input signal to the noise of the heterodyne signal. When the intensity noise of the input signal is the dominant noise source, the intensity noise of the input signal is attenuated to a level where the intensity noise of the input signal is approximately equal to the sum of all other noise components of the combined optical signal. In an embodiment, the signal to noise ratio of the heterodyne signal is maximized when the intensity noise of the input signal is approximately equal to the sum of all other noise components of the combined optical signal. Although FIG. 3 shows the input signal being tapped after the attenuator 324, alternatively, the input signal may be tapped before the attenuator.

The frequency counter 336 is connected to the local oscillator fiber 308 by a coupler 340. The coupler is utilized to tap a portion of the local oscillator signal 306 from the local oscillator fiber 308. The tapped portion of the local oscillator signal is transmitted to the frequency counter. The frequency counter is utilized to monitor the frequency of the local oscillator signal as the local oscillator is swept across a range of frequencies. Alternatively, a wavelength meter may be used to measure the wavelength of the local oscillator signal. The frequency counter can transmit local oscillator frequency information, via connection 342, to the processor 316 so that the frequency information can be utilized by the processor to improve the wavelength accuracy of the heterodyne signal measurement. Although FIG. 3 shows the additional optical receiver 332 and the frequency counter with the same system, the optical receiver or the frequency counter may be added and utilized separately.

FIG. 4 is a depiction of another embodiment of an optical heterodyne detection system. The system of FIG. 4 includes two output fibers 418 and 422 that carry the combined optical signal to the optical receiver 412. In the embodiment of FIG. 4, the optical receiver and the processor 416 can be utilized in conjunction with the two combined optical signals on fibers 418 and 422 to generate an output signal that is independent of the polarization state of the input signal 402 and balanced with regard to the intensity noise component of the combined optical signal.

Figure 5:
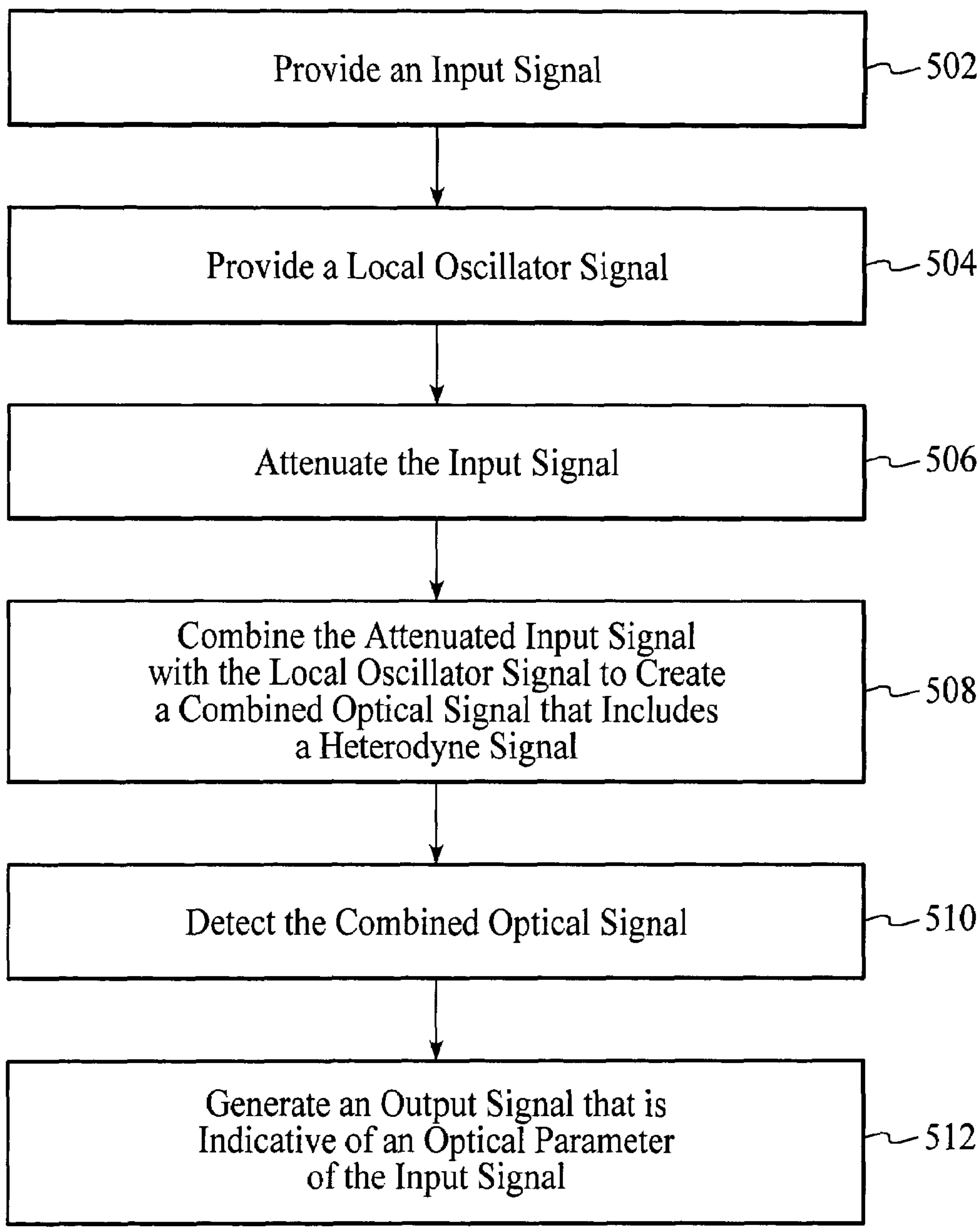
FIG. 5 is a process flow diagram of a method for monitoring an optical signal utilizing optical heterodyne detection in accordance with an embodiment of the invention.

A method for monitoring an optical signal utilizing optical heterodyne detection is described herein and depicted in the process flow diagram of FIG. 5. In a step 502, an input signal is provided. In a step 504, a local oscillator signal is provided. In a step 506, the input signal is attenuated. In a step 508, the attenuated input signal is combined with the local oscillator signal to create a combined optical signal. The combined optical signal includes a heterodyne signal and intensity noise from the input signal. In a step 510, the combined optical signal is detected. In a step 512, an output signal that is indicative of an optical parameter of the input signal is generated. In an embodiment, at step 306 the level of attenuation of the input signal is adjusted to maximize the signal to noise ratio of the heterodyne signal.

In order to obtain accurate measurements from the above-described optical heterodyne detection systems and method, it may be necessary to calibrate some of the system devices. Referring back to FIG. 2 as an example, calibration of the system can be accomplished by utilizing the attenuator 224 to selectively block transmission of the input signal 202. For example, with the input signal completely blocked from transmission by the attenuator, the coupling coefficient of the coupler 210 can be determined as a function of wavelength by sweeping the local oscillator signal 206 across a range of wavelengths. In addition, the responsivity of the receiver 212 can be determined as a function of wavelength by sweeping the local oscillator signal while the input signal is completely attenuated.

With reference to the monitoring system of FIG. 4, the distribution of the local oscillator signal 406 onto the receiver 412 can be determined as a function of wavelength by sweeping the local oscillator signal while the input signal 402 is completely blocked by the attenuator 424. It is preferable that the local oscillator signal is approximately evenly distributed among the output fibers 418 and 422 when providing polarization diversity detection. If the local oscillator signal is not evenly distributed among the output fibers then the power distribution of the local oscillator signal may be adjusted utilizing the polarization controller 420.

What is claimed is:

1. A method for monitoring an optical signal utilizing optical heterodyne detection comprising steps of:

providing an input signal;

providing a local oscillator signal;

attenuating said input signal;

combining said attenuated input signal with said local oscillator signal to create a combined optical signal;

detecting said combined optical signal; and generating an output signal that is indicative of an optical parameter of said input signal.

2. The method of claim 1 wherein said step of generating an output signal includes monitoring a heterodyne signal that is a component of said combined optical signal.

3. The method of claim 2 wherein said step of attenuating said input signal includes a step of attenuating said input signal to a level of attenuation that maximizes the signal to noise ratio of said heterodyne signal.

4. The method of claim 3 further including a step of adjusting said level of attenuation in response to feedback from said output signal in order to maximize said signal to noise ratio.

5. The method of claim 4 further including steps of measuring intensity noise of said input signal before said input signal is combined with said local oscillator signal, comparing said measured intensity noise of said input signal to the sum of all other noise sources related to said combined optical signal, and attenuating said input signal when said intensity noise of said input signal is the dominant noise source.

6. The method of claim 3 further including a step of adjusting said level of attenuation such that intensity noise from said input signal is approximately equal to shot noise from said local oscillator signal.

7. The method of claim 3 further including a step of adjusting said level of attenuation such that intensity noise from said input signal is equal to the sum of all other noises related to said combined optical signal.

8. The method of claim 3 further including a step of sweeping said local oscillator signal across a range of wavelengths in order to monitor said heterodyne signal.

9. The method of claim 1 wherein said step of generating an output signal includes a step of generating said output signal in a manner that is substantially independent of the polarization state of said input signal.

10. The method of claim 1 wherein said step of attenuating said input signal includes a step of completely blocking transmission of said input signal in order to calibrate an optical coupler or an optical receiver as a function of wavelength.

11. A method for monitoring an optical signal utilizing optical heterodyne detection comprising steps of:

providing an input signal;

providing a local oscillator signal;

attenuating said input signal before said input signal and said local oscillator signal are combined;

combining said attenuated input signal with said local oscillator signal to create a combined optical signal, said combined optical signal including a heterodyne signal, intensity noise from said input signal, and shot noise;

generating an electrical signal in response to said combined optical signal;

generating an output signal from said electrical signal that is indicative of an optical parameter of said input signal; and adjusting the level of attenuation of said attenuated input signal to maximize the signal to noise ratio of said heterodyne signal.

12. The method of claim 11 wherein said step of generating an output signal includes a step of monitoring said heterodyne signal and wherein said level of attenuation is adjusted in response to feedback from said output signal.

13. The method of claim 12 wherein said level of attenuation is adjusted such that said intensity noise from said input signal is approximately equal to said shot noise signal.

14. A system for optical heterodyne detection comprising:

an attenuator having an input to receive an input signal and having an output for outputting an attenuated input signal;

an optical coupler having a first input and a second input, said first input being optically connected to said attenuator to receive said attenuated input signal, said second input receiving a local oscillator signal, said optical coupler having an output for outputting a combined optical signal that includes said input signal and said local oscillator signal; and an optical receiver having an input for receiving said combined optical signal from said optical coupler and an output for outputting an electrical signal representative of said combined optical signal.

15. The system of claim 14 further including a processor for receiving said electrical signal from said optical receiver and generating an output signal that is indicative of an optical parameter of said input signal, wherein said processor monitors a heterodyne signal that is a component of said combined optical signal.

16. The system of claim 15 wherein said attenuator is an adjustable attenuator that allows for variable levels of input signal attenuation.

17. The system of claim 16 further including a feedback loop between said processor and said adjustable attenuator, wherein said level of attenuation of said input signal is adjusted to maximize the signal to noise ratio of the heterodyne signal.

18. The system of claim 17 further including a second optical receiver connected to receive a portion of said input signal before said input signal is received by said optical coupler, said second optical receiver being connected to transmit a measure of the intensity noise of said input signal to said processor.

19. The system of claim 16 further including a frequency counter connected to receive a portion of said local oscillator signal before said local oscillator signal is received by said optical coupler, said frequency counter being connected to transmit a measure of the frequency of said local oscillator signal to said processor.

20. The system of claim 15 wherein said optical coupler further includes a second output for outputting a portion of said combined optical signal to said optical receiver, said optical receiver enabling said output signal to be independent of the polarization state of said input signal and balanced with regard to intensity noise of said combined optical signal.

* * * * *

UNITED STATES PATENT AND TRADEMARK OFFICE

CERTIFICATE OF CORRECTION

PATENT NO. : 6,970,250 B1

DATED : November 29, 2005

INVENTOR(S) : Sorin et al.

It is certified that error appears in the above-identified patent and that said Letters Patent is hereby corrected as shown below:

Title page,
Item [57], ABSTRACT,
Line 4, after "order" insert -- to --.

Signed and Sealed this

Twenty-first Day of March, 2006

JON W. DUDAS
*Director of the United States Patent and Trademark Office*